United States Patent
Raghuraman et al.

(10) Patent No.: US 7,694,188 B2
(45) Date of Patent: Apr. 6, 2010

(54) DISK FAILURE PREVENTION AND ERROR CORRECTION

(75) Inventors: Melur K. Raghuraman, Sammamish, WA (US); Kai Chen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 492 days.

(21) Appl. No.: 11/671,156

(22) Filed: Feb. 5, 2007

(65) Prior Publication Data

US 2008/0189578 A1   Aug. 7, 2008

(51) Int. Cl.
   *G06F 11/00*   (2006.01)
(52) U.S. Cl. .......................... 714/47; 714/54
(58) Field of Classification Search .............. 714/47, 714/48, 54, 42, 718, 5–7; 369/53.1
   See application file for complete search history.

(56) References Cited

U.S. PATENT DOCUMENTS

| | | | |
|---|---|---|---|
| 5,914,967 A * | 6/1999 | Yomtoubian ................. | 714/718 |
| 6,316,988 B1 | 11/2001 | Forehand et al. | |
| 6,493,656 B1 | 12/2002 | Houston et al. | |
| 6,535,998 B1 | 3/2003 | Cabrera et al. | |
| 6,600,614 B2 | 7/2003 | Lenny et al. | |
| 6,760,869 B2 | 7/2004 | Lam | |
| 6,785,695 B1 | 8/2004 | Hamilton, II et al. | |
| 6,922,754 B2 * | 7/2005 | Liu et al. ................... | 711/138 |
| 6,950,255 B2 | 9/2005 | Imai | |
| 6,970,972 B2 | 11/2005 | Hosoya | |
| 7,089,445 B2 | 8/2006 | Kaiya et al. | |
| 2002/1440025 | 10/2002 | Poisner et al. | |
| 2003/0097485 A1 | 5/2003 | Horvitz et al. | |
| 2004/0064631 A1 | 4/2004 | Kishon et al. | |
| 2004/0128587 A1 * | 7/2004 | Kenchammana-Hosekote et al. ........................... | 714/43 |
| 2005/0188269 A1 | 8/2005 | El-Shimi et al. | |
| 2005/0262385 A1 | 11/2005 | McNeill et al. | |
| 2006/0075288 A1 | 4/2006 | Forrer et al. | |
| 2006/0195904 A1 * | 8/2006 | Williams ..................... | 726/24 |
| 2006/0248236 A1 * | 11/2006 | Ahmed et al. ................ | 710/5 |

OTHER PUBLICATIONS

Bruce Allen. Monitoring Hard Disks with SMART. http://delivery.acm.org/10.1145/960000/959345/6983.html?key1=959345&key2=8575925611&coll=GUIDE&dl=GUIDE&CFID=8077542&CFTOKEN=68261050. Last accessed Dec. 5, 2006.
Sandeep Shah, et al. Reliability Analysis of Disk Drive Failure Mechanisms. http://ieeexplore.ieee.org/iel5/9660/30517/01408366.pdf?isNumber=. Last accessed Dec. 5, 2006. pp. 226-231.

(Continued)

*Primary Examiner*—Dieu-Minh Le
(74) *Attorney, Agent, or Firm*—Wolf, Greenfield & Sacks, P.C.

(57) ABSTRACT

The subject disclosure pertains to systems and methods that facilitate prevention of hard disk drive failure. Sophisticated drives are likely to be capable of detecting many of the conditions that either cause or precede hard disk drive failure. Such information can be provided to a host operating system, analyzed and used to correct errors associated with the hard disk drive to reduce the probability of failure and/or damage of the hard disk drive. The host operating system can respond by taking corrective actions that alleviate or mitigate hostile conditions (e.g., excessive vibration, heat, humidity and the like) prior to disk failure.

20 Claims, 11 Drawing Sheets

OTHER PUBLICATIONS

Satoshi Asami, et al. Designing a Self-Maintaining Storage System. http://coblitz.codeen.org:3125/citeseer.ist.psu.edu/cache/papers/cs/4896/http:zSzzSznow.cs.berkeley.eduzSzTdzSzPaperszSzselfMaintain.pdf/asami99designing.pdf. Last accessed Dec. 5, 2006.

Kimberly Keeton, et al. Automating data dependability. http://delivery.acm.org/10.1145/1140000/1133391/p93-keeton.pdf?key1=1133391&key2=3938925611&coll=GUIDE&dl=GUIDE&CFID=8081173&CFTOKEN=47967464. Last accessed Dec. 5, 2006. pp. 93-100.

* cited by examiner

DISK FAILURE PREVENTION AND ERROR CORRECTION

CROSS REFERENCE TO RELATED APPLICATION

This application is related to U.S. Provisional Patent Application Ser. No. 60/690,549, filed on Jun. 14, 2005, and entitled HARD DISK DRIVE REAL-TIME CONDITION REPORTING AND ERROR CORRECTION and U.S. Non-provisional patent application Ser. No. 11/297,269, filed on Dec. 8, 2005 and entitled HARD DISK DRIVE CONDITION REPORTING AND ERROR CORRECTION. The entireties of these applications are incorporated herein by reference.

BACKGROUND

Hard disk drives are the primary computer storage device in most computing systems. Maintaining a hard disk drive's proper working environment is critical for preventing a hard disk drive from failing. For example, excessive vibration during hard disk drive operation can cause the read/write head to contact the magnetic disk, scratching the disk surface and damaging the hard disk drive. In addition, sudden changes in temperature and humidity may cause condensation inside the hard disk drive. The condensation may cause the read/write head to adhere to the surface of the disk and prevent the disk from rotating.

Even under optimal conditions, hard disk drives may eventually fail. It is usually simply a question of when the hard disk drive will fail and what impact the failure will have on the computing environment in which the hard disk drive is operating. To minimize loss of data in case of hard disk drive failure, the data on a hard disk drive may be copied or "backed up" to other computer storage media. Generally, businesses and large computer networks have established procedures for copying data from their hard disk drives to a separate storage medium on a periodic basis. Consequently, when a hard disk drive is working correctly and data is copied periodically, a computer or network may spend valuable time copying data from a hard disk drive unnecessarily. Moreover, many individuals and small networks do not make copies of the data on their hard disk drives on a regular basis, if at all. If the hard disk drive data has not been copied for a long period of time prior to a hard disk drive failure, the computer or network may lose valuable data. Restoring or recreating lost data may be expensive, time-consuming and, depending upon the nature of the data, potentially devastating to an individual or business.

As hard disk drives have increased in recording density and data output rate, hard disk drive manufacturers have also increased the sophistication of the hard disk drive to increase performance and mean time between failures. Hard disk drives may include environmental sensors such as temperature, vibration, G-force sensors and the like. Hard disk drives may also detect and track hard disk drive performance including the error rate and the frequency with which the hard disk drive is powered on and off. An error rate, as used herein, is the ratio of the number of occurrences of erroneous data to the total number of units of data. A high error rate for a hard disk drive may indicate a problem with the read/write heads or damage to the magnetic medium. An increase in the error rate may indicate imminent hard disk drive failure.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the provided subject matter concerns prevention of hard disk drive failure. Hard disk drive failure can cause devastating loss of data. However, sophisticated drives are likely to be capable of detecting many of the conditions that either cause or precede hard disk drive failure. Such information can be provided to a host operating system, analyzed and used to protect the drive from hostile operating conditions and/or prevent damage to the hard disk drive.

A host operating system associated with a hard disk drive can include a diagnostic system capable of obtaining and evaluating disk information including, but not limited to, operating conditions (e.g., heat, humidity and vibration), drive performance and most any other data relevant to disk operation and/or risk of failure. The disk information can be evaluated based upon a set of policies specified by the host operating system. Additionally, users can create or modify policies to adapt operation for user requirements. Furthermore, disk information provided by the hard disk drive can include suggested actions to compensate or correct for errors or hostile conditions. Policies can be updated or adapted based upon user preferences and/or usage patterns.

The diagnostic system can utilize a variety of responses or corrective actions to reduce the risk of disk failure. For example, the diagnostic system can control rate of disk input/output (I/O), modify configuration to reduce disk speed, switch to sleep mode, perform disk checks, repair data files and perform most any other suitable action to avert damage to the hard disk drive and/or mitigate loss of data. Additionally, the diagnostic system can monitor disk conditions and evaluate trends over a period of time. In aspects, the diagnostic system can respond automatically to reduce risk of failure without requiring user input. However, a user interface can be provided to notify users of possible failure and allow users to select from possible responses, to specify failure prevention policies and to monitor drive performance.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
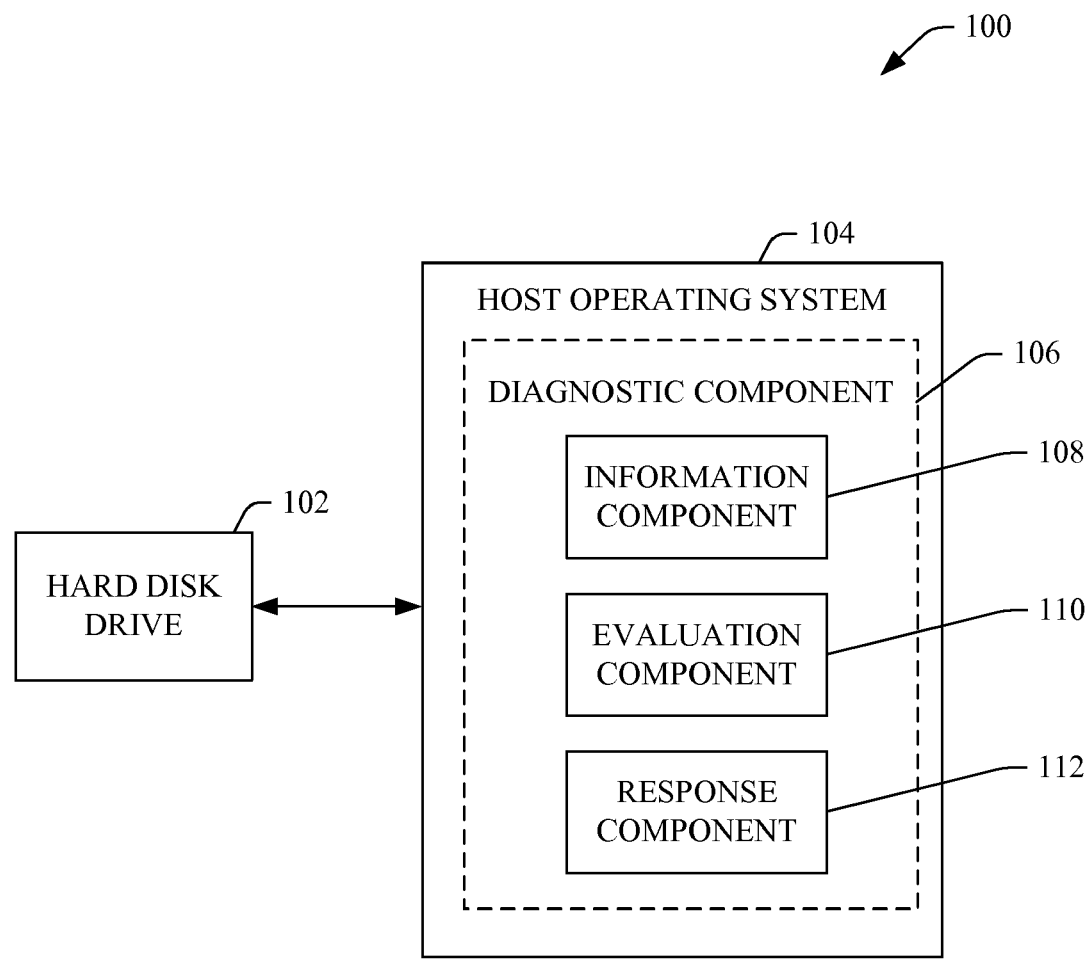
FIG. 1 is a block diagram of a system that facilitates prevention of disk failure in accordance with an aspect of the subject matter disclosed herein.

The various aspects of the subject matter disclosed herein are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. The subject matter disclosed herein is not limited by such examples. In addition, any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Hard disk drives have traditionally had a limited mechanism to provide performance and configuration information to a host operating system. These limitations have been based at least in part upon the fact that hard disk drives are often associated with proprietary data packaging techniques, and manufacturers of hard disk drives do not wish to enable bi-directional communications to occur between hard disk drives and operating systems (for fear of reverse engineering of data packing techniques). Thus, hard disk drives receive commands for data from an operating system (e.g., through user-initiated commands) and accommodate such request by packaging data in a format that can be interpreted by the operating system. Hard disk drives traditionally do not provide information to an operating system without solicitation, as existing hard disk drive interface protocols such as the small computer system interface (SCSI), serial attached SCSI (SAS), parallel ATA (PATA) or serial ATA (SATA) fail to provide a method for communicating hard disk drive environment and performance conditions to an operating system. As a result, if a harmful condition occurs in the hard disk drive system, the hard disk drive has no way of informing the operating system of the harmful condition. Consequently, the operating system has almost no information regarding the performance conditions within the hard disk drive and no way to prevent hard disk drive failure when failure is imminent. Therefore, an operating system will treat a hard disk drive as operating normally until the hard disk drive fails. The operating system is unable to act to correct the harmful condition, to mitigate possible damage and minimize the data loss or to alert users of the potential failure.

However, as communications improve, disk information is increasingly available to host operating systems. Newly created protocols or extensions to existing protocol(s) associated with hard disk drives allow for provision of hard disk drive information to a host operating system. These protocols or extensions thereto enable information to be provided from the hard disk to the operating system. Such information can include notifications, sensed operating conditions and/or a policy that can correct a sensed problem and/or mitigate damage to the hard disk drive.

Turning now to FIG. 1, a system 100 that facilitates disk failure prevention and/or mitigation is illustrated. The system 100 can include one or more hard disk drives 102 in communication with a host operating system 104. The host operating system 104 can be on a computing device, such as a server, a laptop computer, a desktop computer, a personal digital assistant, or any other suitable computing device. The hard disk drive 102 can be sophisticated in the sense that it can self-monitor a plurality of parameters or conditions associated therewith. These parameters can include temperature, vibration, G force, humidity, read speed, write speed, power on time, error rate, power on frequency, duty cycle information, number of reads or writes undertaken by a read/write head, or any other suitable parameters or conditions associated with the hard disk drive. As used herein, the duty cycle of a device is the ratio of the time during which the device is in operation to the time the device is powered off or cooling down. Manufacturers may limit a device's rated capacity to continuously perform work under normal conditions. For example, a hard disk drive with an 80% duty cycle rating is capable of running 80% of a specified time period and should be turned off or cooled down for the remainder of the time period. Operating a hard disk drive above the rated duty cycle may damage the hard disk drive, leading to hard disk drive failure and voiding the manufacturer's warranty.

The hard disk drive 102 can provide disk information relevant to the hard disk drive to the operating system 104. Disk information can include disk parameters or conditions and any other information related or relevant to disk performance. For example, hard disk drive firmware (not shown) can include information regarding disk limitations, standards and operating conditions. The host operating system 104 can utilize such information to prevent or avert drive damage or failure and to mitigate possible impact of drive damage.

The host operating system 104 can include a diagnostic component 106 capable of responding to hostile conditions to minimize probability of drive failure. The diagnostic component 106 can include a disk information component 108 that obtains disk related information. The disk information component 108 can receive disk information transmitted by the hard disk drive 102 or poll the hard disk drive 102 for disk information. The disk information component 108 can receive disk relevant information from any suitable source. For example, data relevant to disk operation can be received from external sensors (e.g., thermal sensor, vibration sensors and the like).

The diagnostic component 106 can include an evaluation component 110 that analyzes provided disk information and determines an appropriate course of action to minimize risk of drive failure. Appropriate actions can depend upon type of conditions experienced by the drive, severity of the conditions, urgency of conditions, as well as time period over which the conditions persist. Types of conditions can include, but are not limited to, excessive vibration, heat, humidity, excessive duty cycles and the like. Any condition, use or state that effects disk performance and increases or affects the risk of drive failure can be evaluated. The severity of conditions indicates acuteness as measured based upon condition type; while urgency reflects the likelihood that the condition will result in drive damage. In addition, the time period over which the disk drive has experienced the condition can impact the effect of the condition upon probability of drive damage or failure.

A response component 112 can direct an action or actions to be taken to reduce probability of drive failure. Responses can include continued monitoring of conditions and/or behavior of the disk drive as well as corrective actions intended to protect the drive from damage. For example, corrective actions can include throttling or reducing disk drive input and output (I/O). During periods of excessive vibration, reduction in the motion of the read/write head relative to the magnetic disk decreases the probability that the head will come into contact with the magnetic disk, scratching the disk surface and damaging the hard disk drive. Other corrective actions include adjusting fan speed, alerting users, prompting users to adjust external conditions (e.g., vibration, heat), shutting down the hard disk drive and the like.

The response component 112 can also act to mitigate data loss in the event of disk failure as well as attempting to avoid damage to the disk drive. Disk information can be used to intelligently protect data in case disk failure cannot be averted. Disk information can be analyzed to determine when an event has occurred that is likely to have damaged the disk drive. The response component 112 can test or evaluate the integrity of data files likely to be affected by such damage based upon the disk information and attempt to recover any affected files. In addition, the response component 112 can schedule routine backups of user data based upon increased risk of drive failure.

The diagnostic component 106 can also detect when a hostile condition ceases or has been alleviated and automatically return to normal operations. The hard disk drive 102 can provide information indicating the end of a hostile condition (e.g., return to normal temperature, cessation of excessive vibration and the like). Upon receipt of such disk information, the evaluation component 110 can analyze the change in the hostile condition as well as the corrective action or actions that were taken with regard to the conditions and resume normal operations. For example, if hard disk drive I/O operations were reduced due to excessive vibration, if such vibrations cease, disk drive I/O operations can return to previous levels.

Figure 2:
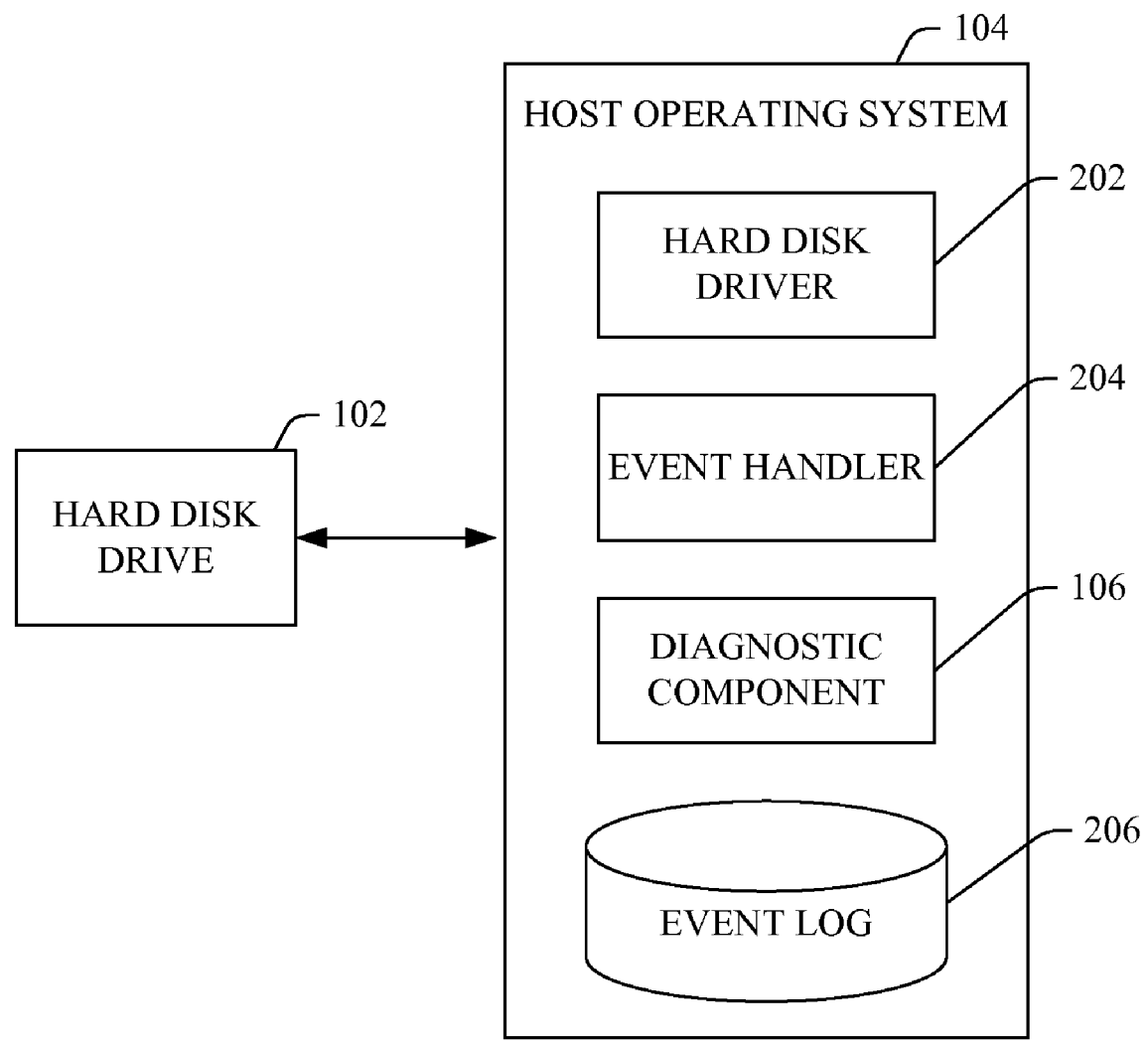
FIG. 2 is a block diagram of a system that facilitates prevention of disk failure utilizing event handling in accordance with an aspect of the subject matter disclosed herein.

Referring now to FIG. 2, disk information can be interpreted as system events delivered to the diagnostic component 106. The hard disk drive 102 can include a variety of sensors to monitor its operating environment. When the hard disk drive 102 detects a hostile condition (e.g. high temperature, constant vibration, sudden hard physical shock, duty cycle overload, etc.), the drive 102 can send an asynchronous notification including disk information to the host operating system 104, alerting the operating system 104 to the hostile condition. Alternatively, the host operating system 104 can poll the hard disk drive 102 to determine current operating conditions. The host operating system 104 can include a hard disk driver 202 (e.g., an ATA port driver) that receives the notification from the hard disk drive 102. Disk information can include, but is not limited to, severity level of the condition, urgency of the condition, and an absolute measurement of the condition. For example, if the hard disk drive is greater than normal, the hard disk driver 202 will receive a notification that the drive 102 encountered a low severity high temperature condition, the problem requires no immediate action but should be dealt with in the near future, and the current temperature is 110 F.

The hard disk driver 202 can utilize the information received in the notification from the hard disk drive 102 to generate a system event. The event can be delivered to an event handler 204, which receives and distributes events within the host operating system 104 to provide for communication among components. The diagnostic component 106 can register with the event handler 204 to receive events associated with the hard disk drive 102. Upon receipt of an event from the hard disk driver 202, the event handler 204 will check its registration database (not shown), determine that the diagnostic component 106 has registered for the event and provide the event to the diagnostic component. Consequently, all events generated by the hard disk driver 202 will be delivered to the diagnostic component 106 for evaluation and corrective action, as necessary.

The event handler 204 can also append any hard disk drive events to an event log 206. Typically, an event log 206 maintains a record of events or occurrences for the operating system 104. System administrators frequently utilize event logs to monitor system health and schedule or perform maintenance. The diagnostic component 106 can provide additional information to the event log 206 regarding hard disk drive status, conditions, actions taken to correct hostile or unfavorable conditions and the like. In addition, other software applications can utilize data maintained within the event log 206 for system evaluation and maintenance.

The event log 206 can be an invaluable source for system administrators, users and vendors. The event log 206 can include information regarding events indicating, cause or leading up to disk failure. In addition, the event log can contain a record of actions taken to avert disk failure and the relative success or failure of various courses of actions. Such data can be advantageous in developing hard disk drives, hard disk drivers, systems utilizing hard disk drives and other software and related hardware. Information from an event log can be provided to a service provider periodically to allow for analysis of such data.

Figure 3:
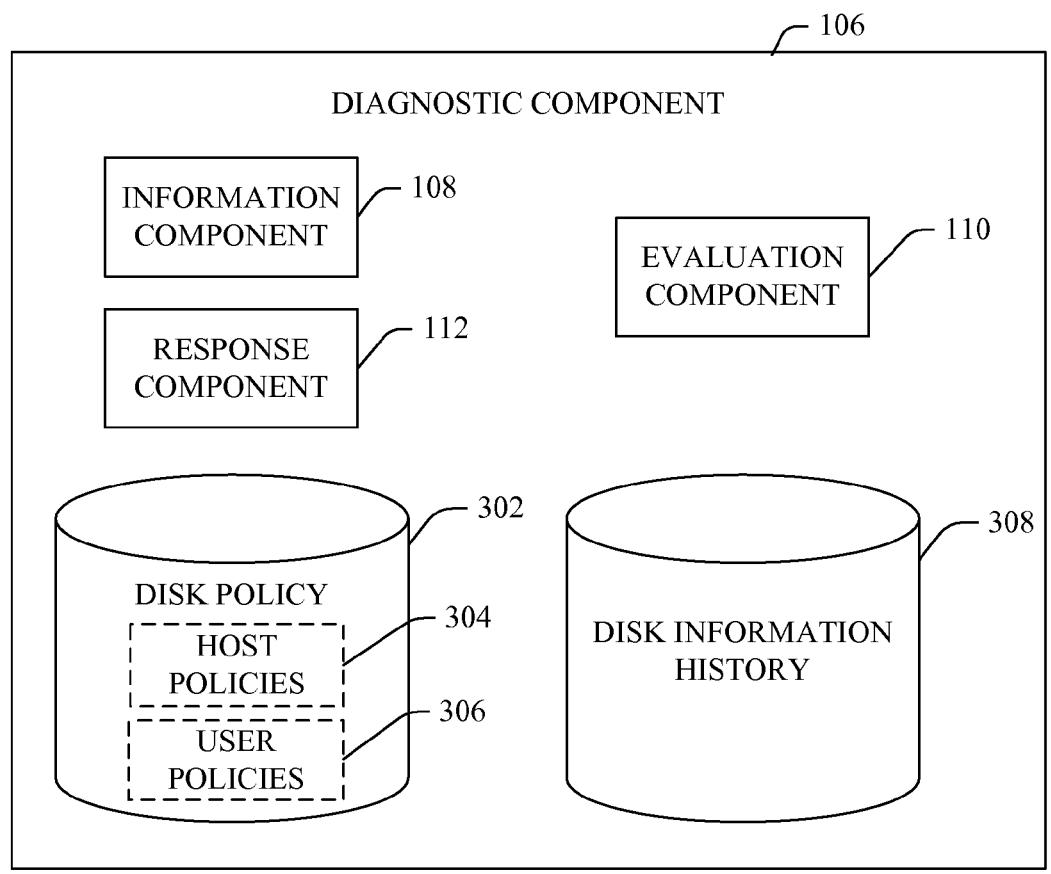
FIG. 3 is a block diagram of a diagnostic component that facilitates prevention of disk failure in accordance with an aspect of the subject matter disclosed herein.

Referring now to FIG. 3, a diagnostic component 106 utilizing a set of policies to prevent drive failure is illustrated. The diagnostic component 106 can include and/or obtain data from a disk policy data store 302. The disk policy data store 302 can include a set of policies that provide for analysis of disk information and determine the appropriate response to reduce risk of drive damage or failure. Upon receipt of disk information by the disk information component 108, the evaluation component 110 can retrieve relevant policies from the disk policy data store 302. Operating systems connected to multiple hard disk drives may utilize multiple sets of disk policies.

The disk policy data store 302 can include two sets of policies: policies defined by the host operating system, referred to herein as host policies 304, and user-defined policies 306. In general, host policies 304 can determine the appropriate response, generally intended to reduce risk of drive failure while minimizing disruption to users. A host policy 304 can specify a response based on the type of hostile condition, the severity level of the condition, the urgency, and the history of the particular condition. For example, the host policy 304 may specify that minor vibrations can be ignored, but that particular actions (e.g., reducing I/O, entering sleep mode) are to be taken when the drive has been shaking badly for an extended period of time. The host policy 304 can determine thresholds for particular actions, define time periods over which conditions are to be monitored and determine varying levels of responses (e.g., amount of reduction in I/O). The host policy 304 can also specify a time period between responses to avoid repeated corrections of the same problem based upon multiple notifications of a hostile condition within a short period of time. Typically, host policies 304 provide specific instructions to identify problematic conditions, correct such conditions and avert disk failure.

User policies 306 can be configured by individual users and used to augment the host policies. In general, a user policy 306 will reflect user preferences without asking users to make decisions requiring specific, technical knowledge about the drive. For example, a typical user will not have the technical expertise to set temperature and vibration thresholds. However, user policies 306 can have the capability to allow users define such policies. In addition, the user can opt to suppress certain types of warnings and to override certain corrective actions. For example, a user who utilizes their laptop primarily in flight can define a policy that prevents the evaluation component 110 from entering into sleep mode due to excess vibration. The user may elect increased risk of drive failure to avoid the inconvenience of frequent interruptions.

The diagnostic component 106 can also include a disk history data store 308. The disk history data store 308 can maintain information regarding the state of the hard disk drive. The evaluation component 110 can utilize data retrieved from the disk history data store 308 to determine trends (e.g., a gradual increase in disk drive temperature) as well as usage patterns. In addition, the diagnostic component 106 can utilize information retrieved from the event log or any other data source in determining an appropriate response.

The evaluation component 110 can also utilize suggestions generated by the hard disk drive and provided within the disk information to determine an appropriate response to a hostile condition. Hard disk drive firmware can include detailed information regarding the drive's capabilities, limitations and responses most likely to correct or alleviate hostile conditions and prevent hard disk drive failure. In fact, the hard disk drive is most likely to have the information specific to the drive make or model. The hard disk drive can include a set of suggested responses within the disk information provided to the host operating system. The evaluation component 110 can evaluate the suggested responses in light of the host policies 304 and user policies 306 and determine the preferred course of action.

The diagnostic component 106 can also utilize information regarding system context to determine an appropriate responses. System context can include system configuration information as well as current system status. System configuration may affect the selection of an appropriate response to hard disk drive performance conditions. If the hard disk drive is experiencing excessive duty cycles in a personal computer, for example, the appropriate reaction may be to temporarily prevent a user from accessing the hard disk drive. For a hard disk drive connected to a network server, the appropriate response to excessive duty cycles may be network load balancing. As used herein, load balancing means distributing the data and processing evenly across system resources to prevent overloading any single device.

The system status may also affect selection of an action or policy provided to the operating system. For example, the diagnostic component 106 can direct the operating system to shut down a hard disk drive when it is registering an excessive temperature reading at 4 a.m. when there are no or a small number of users logged into the system. However, the diagnostic component 106 can select a different response if the excessive temperature occurs at 10 a.m. on a Monday when a large number of users are logged in to the network server.

The response component 112 can prioritize tasks in response to hostile conditions. For example, a user on a train may utilize their laptop to edit important files and to listen to audio files. If excessive vibrations are detected, the evaluation component 110 can determine that disk I/O should be reduced to decrease risk of disk failure. The response component 112 can give high priority to the document-editing task and low priority to the audio files, maintaining disk I/O for the higher priority task while reducing disk I/O for the lower priority task. Alternatively, the response component 112 can elect to terminate the lower priority task. In the preceding example, the audio files can be closed while allowing the user to continue access the word processing document.

Figure 4:
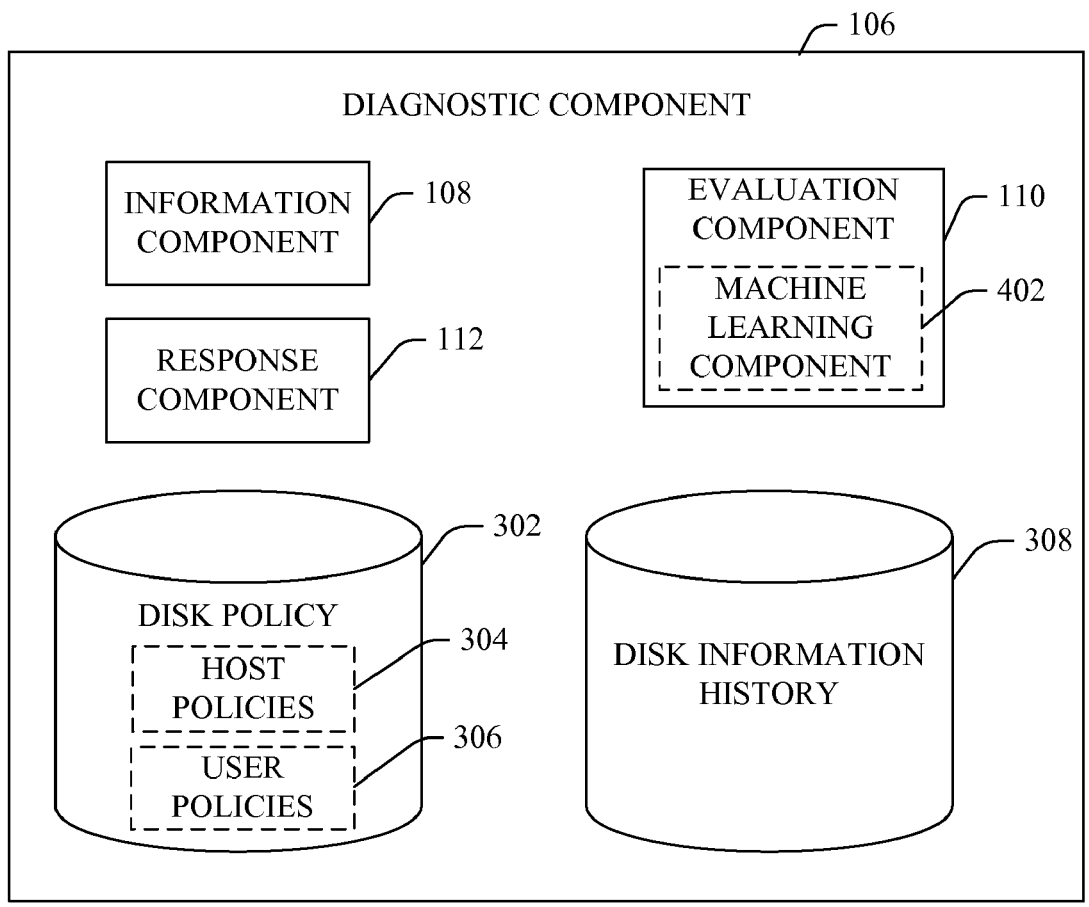
FIG. 4 is a block diagram of a diagnostic component that utilizes machine learning to prevent of disk failure in accordance with an aspect of the subject matter disclosed herein.

Referring now to FIG. 4, the evaluation component 110 can utilize a variety of techniques to analyze disk information, policies, disk history and any other relevant information. In particular, the evaluation component 110 can include a machine learning component 402 capable of utilizing information regarding hard disk drive information, system context, corrective actions and user actions to optimize responses. In particular, the machine learning component 402 can utilize artificial intelligence techniques including, but not limited to, (e.g., support vector machines, neural networks, expert systems, Bayesian belief networks, fuzzy logic, data fusion engines, classifiers).

The machine learning component 402 can be trained prior to installation and adapted based received disk information, system context and usage patterns. The machine learning component 402 can be trained based upon data maintained by the disk history data store 308. After training, the machine learning component 402 can be fixed or frozen or the component can be continually updated to reflect changes to the hard disk drive usage or conditions.

Figure 5:
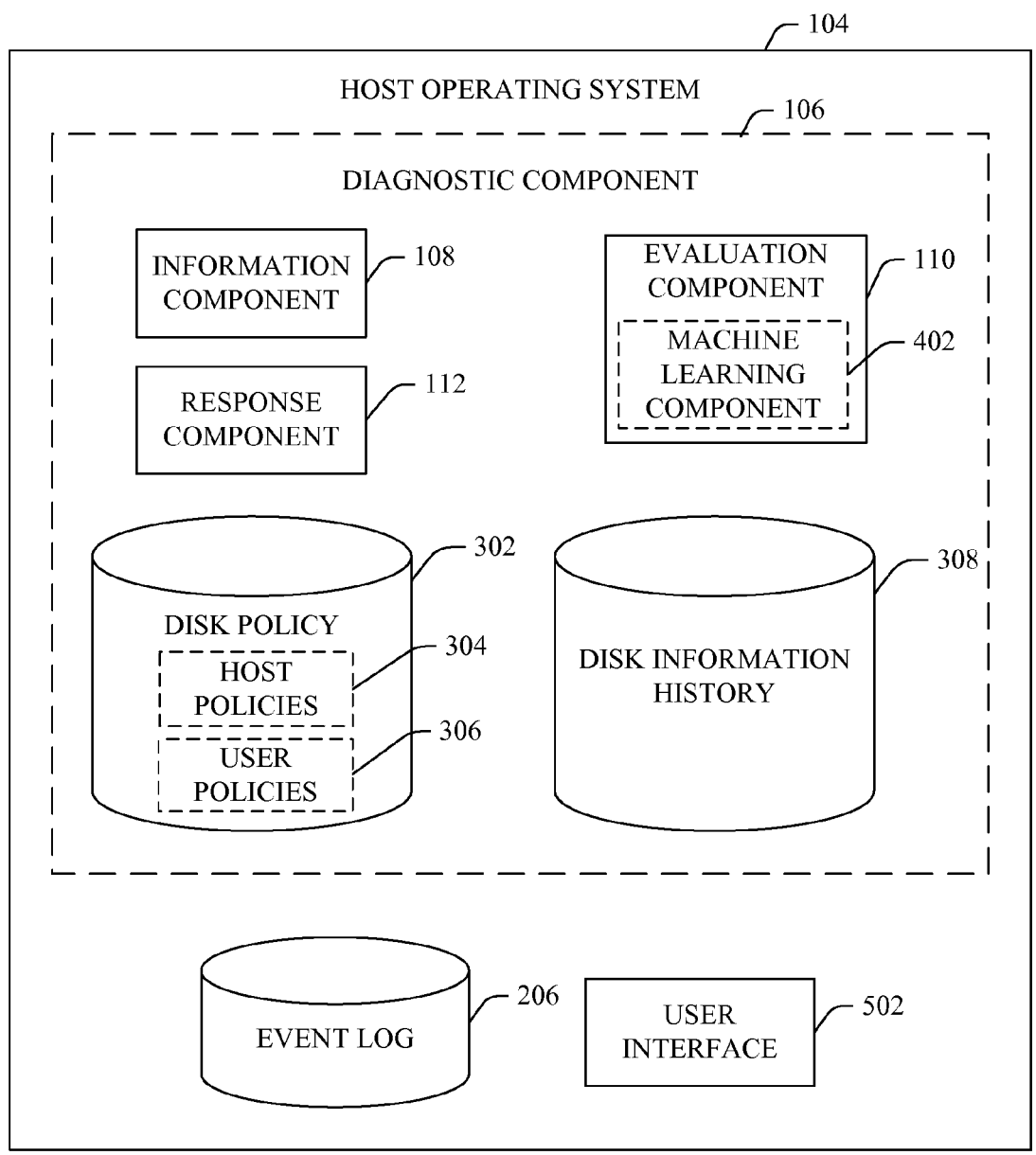
FIG. 5 is a block diagram of a system that prevents disk failure including a user interface in accordance with an aspect of the subject matter disclosed herein.

Turning now to FIG. 5, the diagnostic component 106 can include a user interface 502 (e.g., a graphical user interface) that can provide a user with information relating to the disk information, possible corrective actions and/or alerts. The information can be in the form of a warning and can provide the user with possible actions that may be undertaken to prevent loss of data and/or damage to the hard disk drive. For example, the user interface 502 can generate a warning such as "temperature associated with your hard disk is too high—check fan." It can be discerned from the example that any suitable warning may be provided to users regarding a magnitude of possible operating parameters. Moreover, a graphical user interface can include selectable buttons that enable the user to select a particular action to be undertaken by the host operating system. For instance, depression of a button (through utilization of a mouse, for example) provided on a graphical user interface can cause the operating system 104 to power down a computer. Furthermore, the user interface 502 can relay information through a variety of means. For instance, the user interface 502 can generate and deliver an email, instant message, text message and the like to a user, system administrator or other interested party.

The user interface 502 can also be used to specify or define user policies. For example, the user interface 502 can include a graphical user interface (GUI) to assist users and system administrators in creating, updating or modifying the user policies. Similarly, the user interface 502 can include a wizard to aid users in defining user policies.

In general, user directions and policies received via the user interface will override host policies. In certain extreme cases, the diagnostic component may need to override user decisions in order to protect the hard disk drive or the user data. For example, the diagnostic component may need to forcefully put a computer to sleep and spin down the hard disk drive, when a catastrophic failure is likely occur if the drive continues to operate under the current hostile conditions. However, such extreme actions must be exercised with care to avoid user frustration. In addition, users should be informed of the occurrence and reasons for the extreme actions.

The user interface 502 can also be used to view the event log 206. As described above, the diagnostic component 106 can append information to the event log 206, including disk information, corrective actions and any other relevant information. Consequently, the event log 206 can include information valuable to users, system administrators and vendors. The user interface 502 can provide an easy to use interface to search the event log, identify relevant information and view such data.

The interaction of various components in averting hard disk failure can be further illustrated in the following example. Business travelers frequently use their laptops, containing hard disk drives, on airplanes, in flight. During flight, a plane can begin experiencing strong turbulence, jarring the laptop and hard disk drive. Sensors located in the drive can detect that the disk drive is shaking and notify the laptop operating system. More particularly, the hard disk driver can receive information from the hard disk drive and generate a series of events indicating excessive vibration. The events can be provided to a diagnostic component of the laptop.

The diagnostic component may not respond to the first vibration event or few events since minor vibrations occur frequently. However, after repeated events, the diagnostic component can determine that the drive has been shaking fairly badly for quite some time and that a corrective action is required. The determination can be based upon information provided by the hard disk drive, including recommend responses, host policies and user policies and any other available information.

The diagnostic component can instruct the input/output (I/O) manager to throttle I/O to reduce the risk of damaging the hard disk drive. The diagnostic component can also temporarily "freeze" the laptop to reduce disk drive operations. The user may notice that he or she no longer has access to the programs that were running, except for single user interface from diagnostic component. The user interface can inform the user that the laptop is shaking and the vibrations can damage the hard disk drive. Therefore, the operating system has entered a protection mode. The user can be given the option to put the machine to sleep, saving data and ceasing operation, or unfreeze the laptop to resume work. The risks associated with electing to resume operations can be explained via the user interface. In addition, the user may leave the computer frozen for the time being. When the turbulence stops, the disk drive can detect the cessation of excessive vibration and the diagnostic component can automatically unfreeze the laptop and revert to normal operations. As shown in the preceding example, the diagnostic component is able to act to protect the disk drive and avert drive failure prior to the loss of data.

The diagnostic component can also act to protect user data when disk damage or failure cannot be avoided. For example, if a user accidentally bumps a desktop computer, the hard disk drive on the computer can detect a hard physical shock and inform the host operating system. The hard disk drive can provide information regarding the logical block number (LBN) that is likely to have been impacted. LBN can be based upon the location of the read/write head relative to the magnetic disk at the time of the shock. If the drive was jarred badly enough that the head came into contact with the magnetic disk, the sector or portion of the disk proximate to the head at the time of the shock will most likely be affected.

The host operating system, or more specifically the diagnostic component, can utilize the information regarding the impacted LBN and begin a mini-scan on the impacted areas of the magnetic disk to check for any files damaged during the shock. If damaged files are detected, the diagnostic component can automatically attempt to repair such files utilizing the system file cache. If there are no damaged files or if the diagnostic component successfully repairs all damaged files, the user need not be notified. To the user, the entire evaluation and recovery will have been transparent.

If there are damaged files that the diagnostic component is unable to repair, the user can be informed regarding the damaged files and provided with manual recovery suggestions. If diagnostic component detects that shocks occur frequently based upon the hard disk drive history, the diagnostic component can also notify user to handle the computer with care via a graphic user interface, email, text message, instant message or other user interface.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Additionally, it should be noted that one or more components may be combined into a single component providing aggregate functionality or divided into several sub-components. The components may also interact with one or more other components not specifically described herein but known by those of skill in the art.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 6:
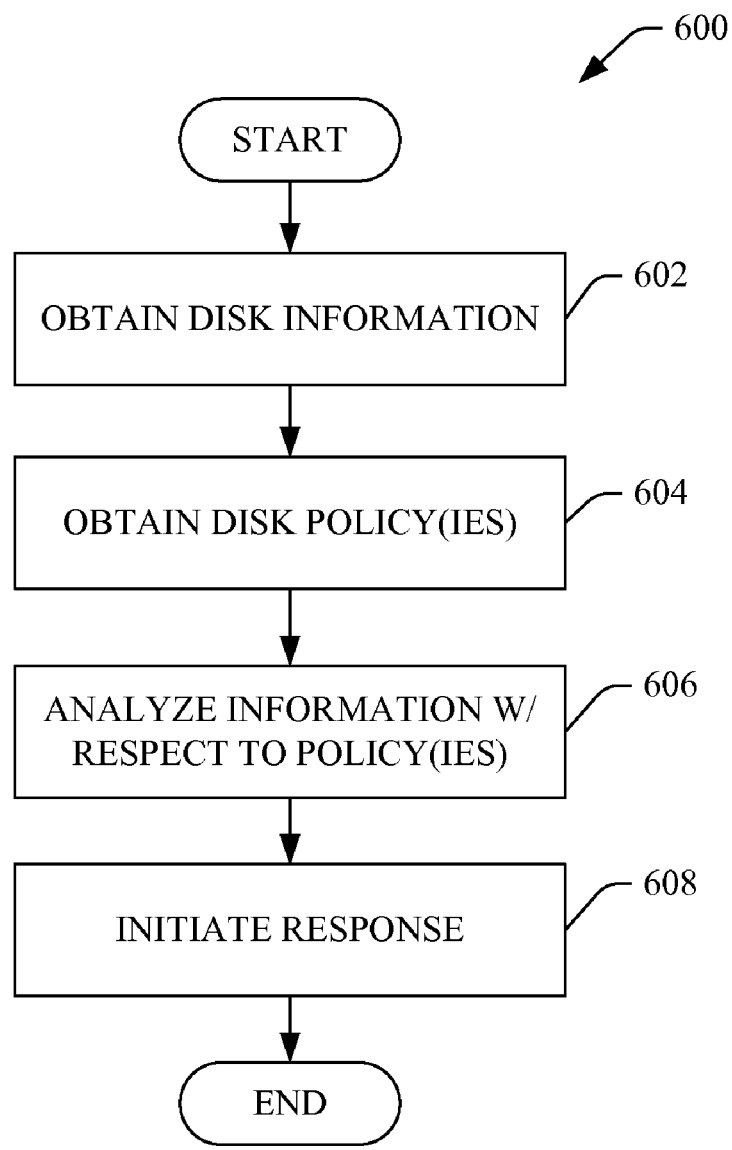
FIG. 6 illustrates a methodology for reducing risk of hard disk failure in accordance with an aspect of the subject matter disclosed herein.

Referring now to FIG. 6, a methodology 600 for preventing disk failure is illustrated. At 602, disk information relevant to a hard disk drive is obtained. The hard disk drive can transmit disk information periodically indicating disk drive status. Alternatively, the disk drive can transmit alerts asynchronously when hostile operating conditions are detected. In addition, a host operating system can poll one or more associated disk drives to monitor disk drive status. Disk information can include any information relevant to the status, performance, operating conditions or likelihood of failure of the disk drive.

At 604, one or more policies for evaluating disk drive information can be obtained or retrieved. Policies can be pre-defined, defined by the user and/or provided by the hard disk drive. In particular, the hard disk drive can include policy information with the disk information. The disk information can be analyzed with respect to the retrieved policies at 606. The analysis can evaluate the type, severity, urgency and a value associated with the hostile condition as well as one or more possible responses.

At 606, the appropriate response can be initiated to prevent or reduce risk of disk damage or failure. Responses can include corrective actions such as reducing disk I/O, adjusting fan speed, shutting the disk drive, or performing any other actions that decrease probability of damage to the hard disk and loss of data. In addition, the appropriate response can consist of simply recording or logging hard disk drive conditions for further analysis. Frequently, it is the occurrence of hostile conditions over a period of time that likely to cause problems, rather than a single occurrence. Accordingly, log information can be invaluable in predicting and avoiding disk drive failure.

Figure 7:
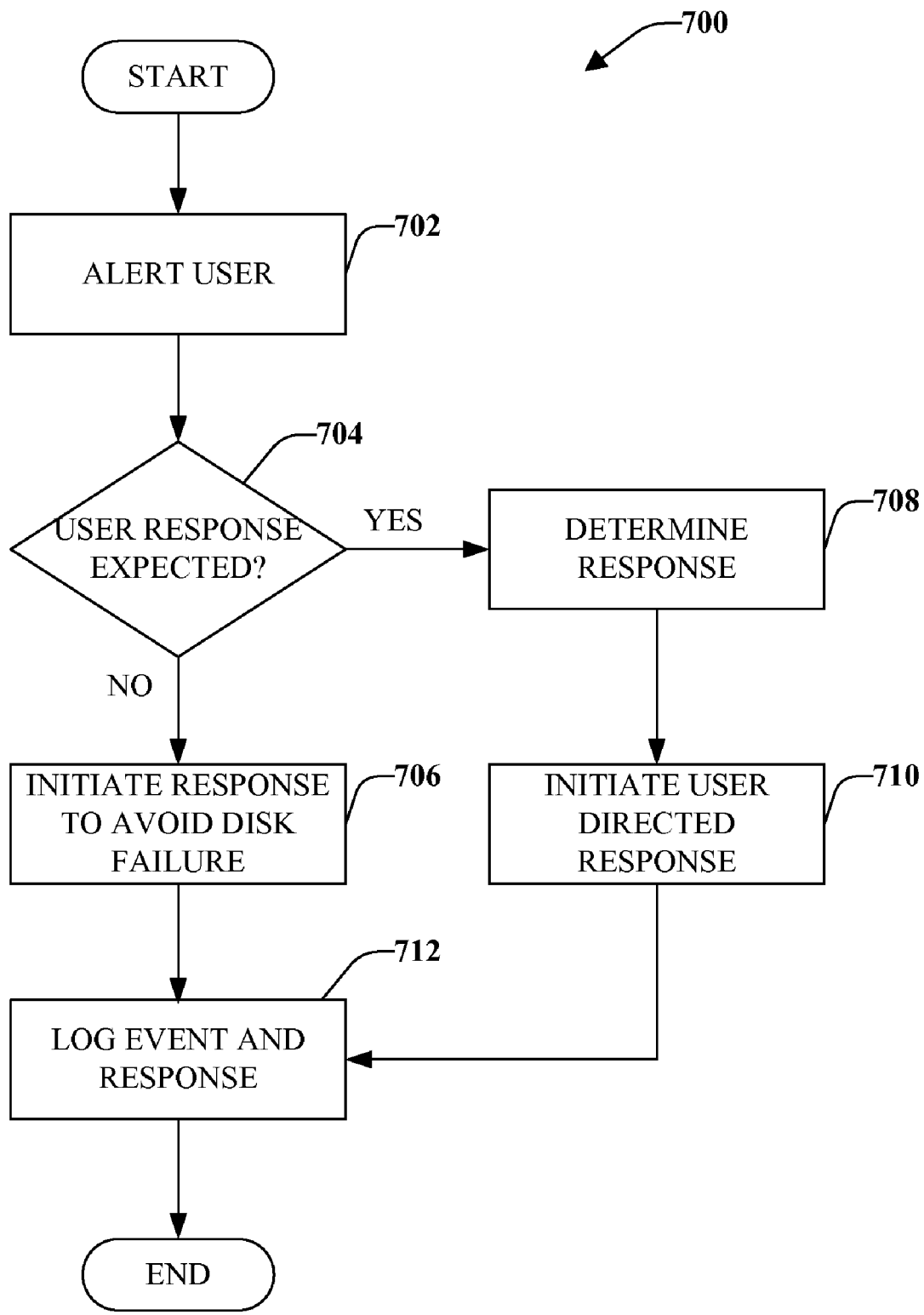
FIG. 7 illustrates a methodology for responding to reduce risk of hard disk failure in accordance with an aspect of the subject matter disclosed herein.

Turning now to FIG. 7, a methodology 700 for responding to hostile conditions to prevent hard disk failure is depicted. In general, if the operating system is able to correct the hostile conditions without affecting the user, it can do so with out alerting and interrupting the user. However, in many cases, the available responses can affect the user. In such cases, users can be alerted to the possibility of hard disk drive damage and available responses.

At 702, a user alert is generated in response to hostile conditions. A user alert can be an audio alert, visual cue or most any other suitable method of notifying user of possible disk failure. In particular, an alert take the form of an email message, instant message, text message or graphical user interface. The alert can provide the user with information regarding nature and severity of the conditions predicted to cause, or indicative of, disk failure. In addition, the alert can describe suggested actions to avert disk failure and/or loss of data.

At 704, a determination is made as to whether a user response to the alert is expected. If no, the operating system can direct the appropriate response based upon available policies and information at 706. If a user reaction is expected in response to the alert, the user's response can be determined at 708. User responses can include selecting a response from a set of suggested options, performing manual backup of data, disregarding the alert or any other available action. Based upon the user input, a user-based response can be initiated at 710. For instance, if the user selected an option from a suggested list of responses, the selected response can be initiated. In addition to a user-directed response, the operating system can initiate other actions consistent with the user response to prevent failure of the disk and/or mitigate the loss of data.

At 712, disk information regarding the conditions that triggered the alert can be recorded in an event log. In addition, both system and user-directed responses can be recorded within the event log. The resulting event log can include invaluable information regarding indicia and causes of disk failure as well as the success or failure of particular actions in averting disk failure.

Figure 8:
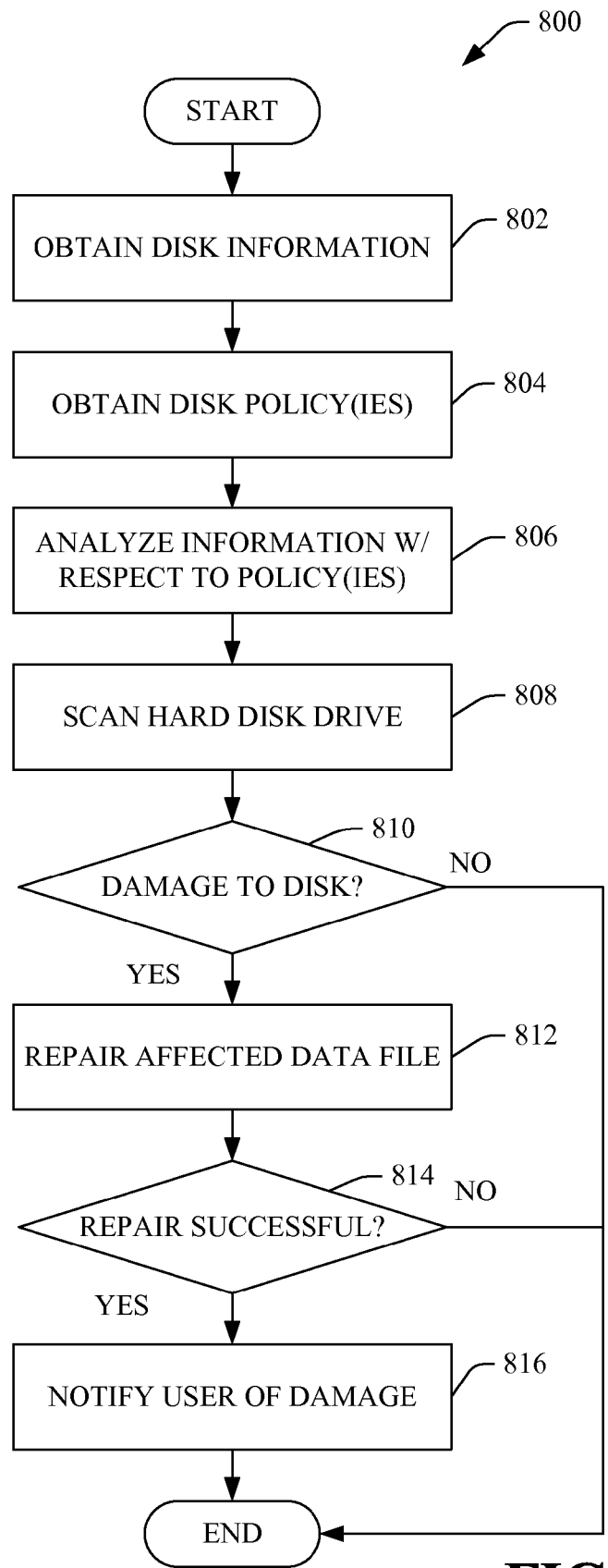
FIG. 8 illustrates a methodology for protecting data in case of hard disk failure in accordance with an aspect of the subject matter disclosed herein.

Referring now to FIG. 8, a methodology 800 for protecting data in the event of disk damage is depicted. In addition to preventing disk damage, data loss due to unavoidable damage can be mitigated. At 802, disk information is obtained indicating possible disk failure. For example, the disk information can indicate that the drive experienced excessive vibration. The disk information can include data regarding the sector or LBN likely to have been impacted by the failure. At 804, any policies or other information relevant to the analysis of the disk information can be obtained and at 806, the disk information can be evaluated in accordance with retrieved policies.

In particular, the appropriate response can include scanning the portion of the hard disk drive likely to have been damaged at 808. At 810, a determination is made as to whether the disk was actually damaged. If no, the process ends and no further action may be necessary. Additional actions can be taken to prevent further damage to the hard disk drive. For example, a warning to avoid excessive jarring of the disk drive in the future can be delivered to the user.

If it is determined that the disk drive is damaged at 810, the operating system can attempt to repair any data impacted due to the disk drive damage at 812. For example, if relevant portion of the file was maintained in cache at the time of the failure, the data may be retrieved from cache. At 814, a determination can be made as to whether the repair was successful. If the repair was successful in restoring the relevant data, the process can terminate or take additional actions to avoid further damage to the drive. If the repair was unsuccessful, further actions can be taken to mitigate the loss of data. For example, at 816, the user can be notified of the impact and manual restoration of the data file can be recommended.

Figure 9:
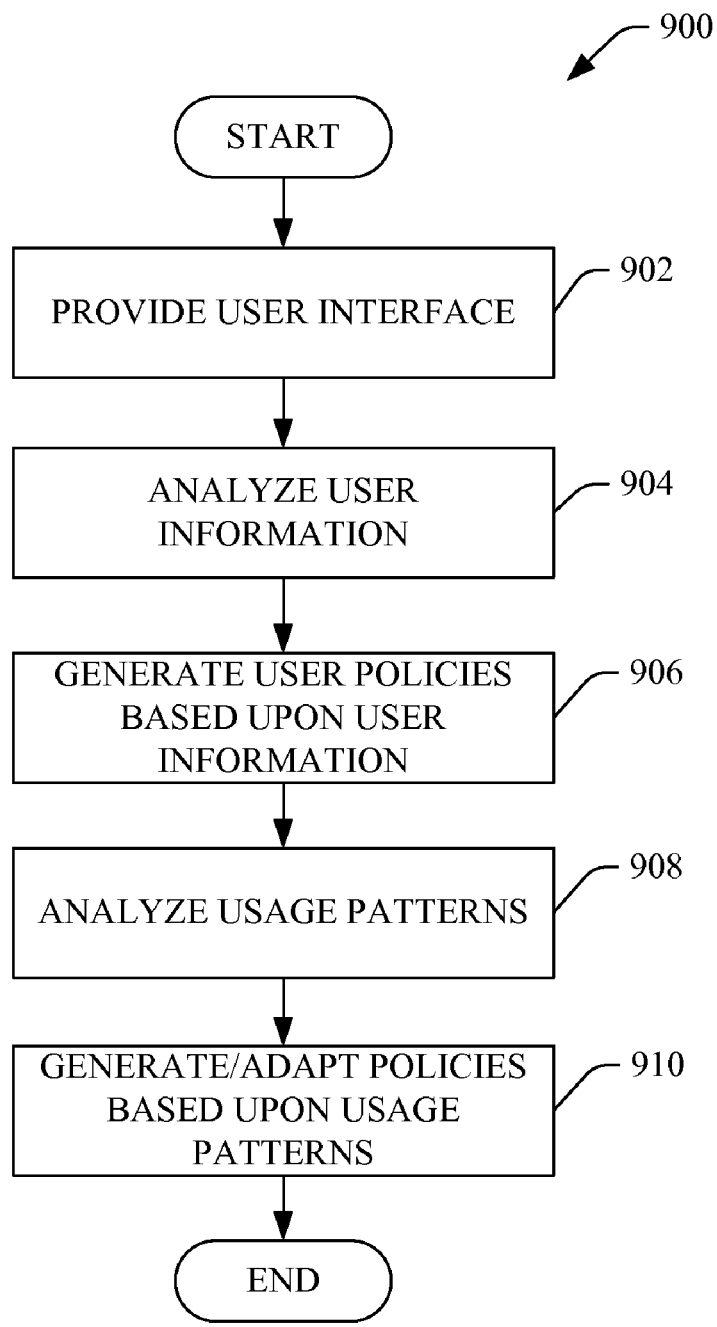
FIG. 9 illustrates a methodology for individualizing disk failure prevention in accordance with an aspect of the subject matter disclosed herein.

Turning now to FIG. 9, a methodology 900 for personalizing hard disk drive failure prevention is illustrated. At 902, a user interface can be provided that allows for the specification of particular policies or preferences for use in hard disk drive monitoring, failure prevention and data loss mitigation. The user interface can include a graphical user interface that allows a user to select from available options. Alternatively, the user interface can include a simple file or any other mechanism with which the user can define policies, rules and/or preferences.

At 904, information specified by the user can be analyzed. At 906, the provided information can be used to generate a set of policies that influence evaluation of disk information and selection appropriate actions in response to adverse conditions. Such user directed policies can be used in combination with host policies and may override host policies. However, under certain circumstances, such as likely catastrophic failure, host policies may take precedence.

At 908, information regarding usage patterns can be analyzed. Usage patterns can indicate user preferences and can include the type of tasks regularly performed using the system, user response to warnings or alerts, user actions or selections to avert disk failure and the like. At 910, such information can be used to adapt existing policies, generate additional policies and optimize disk failure prevention for a particular user.

Figure 10:
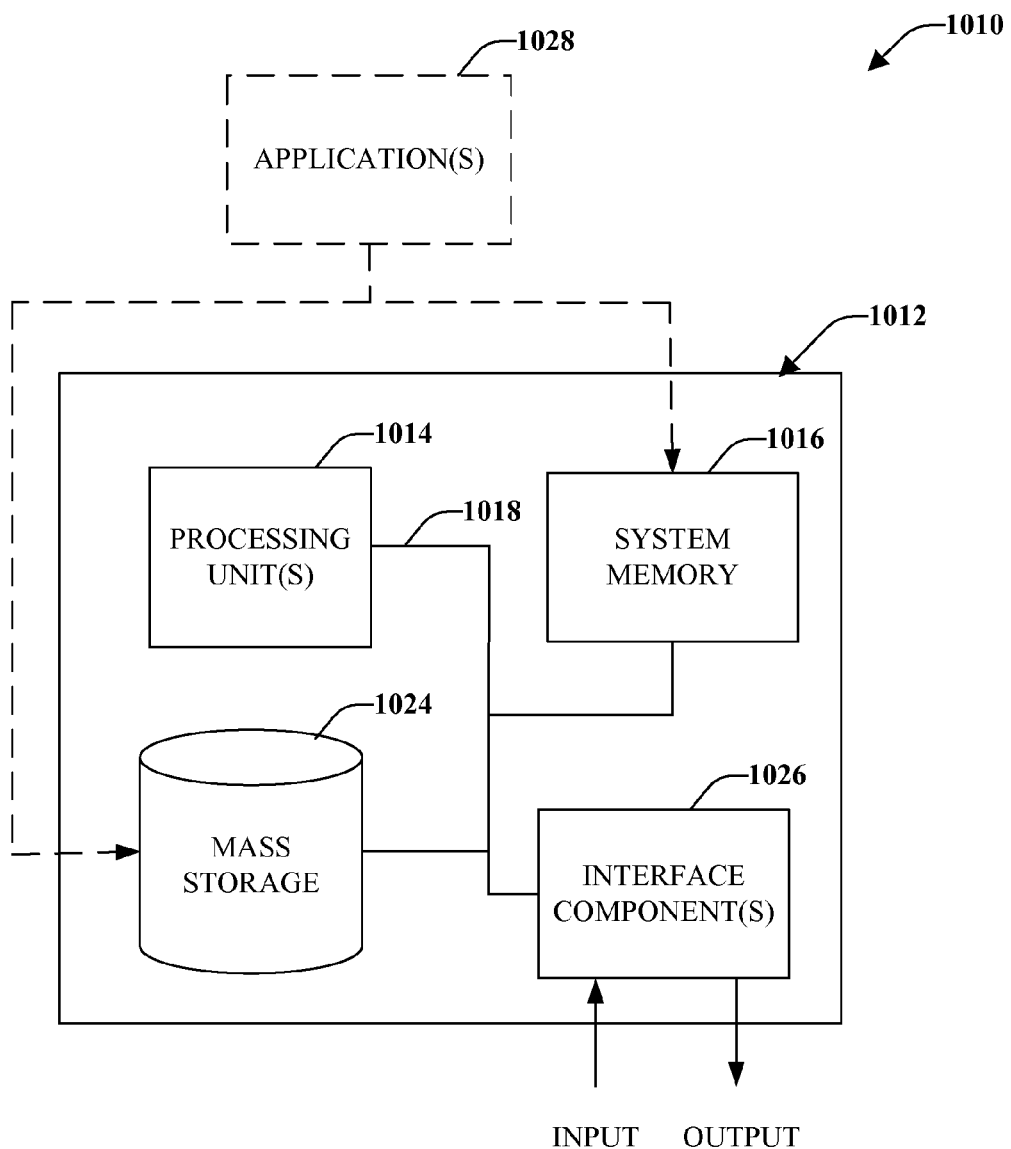
FIG. 10 is a schematic block diagram illustrating a suitable operating environment.
Figure 11:
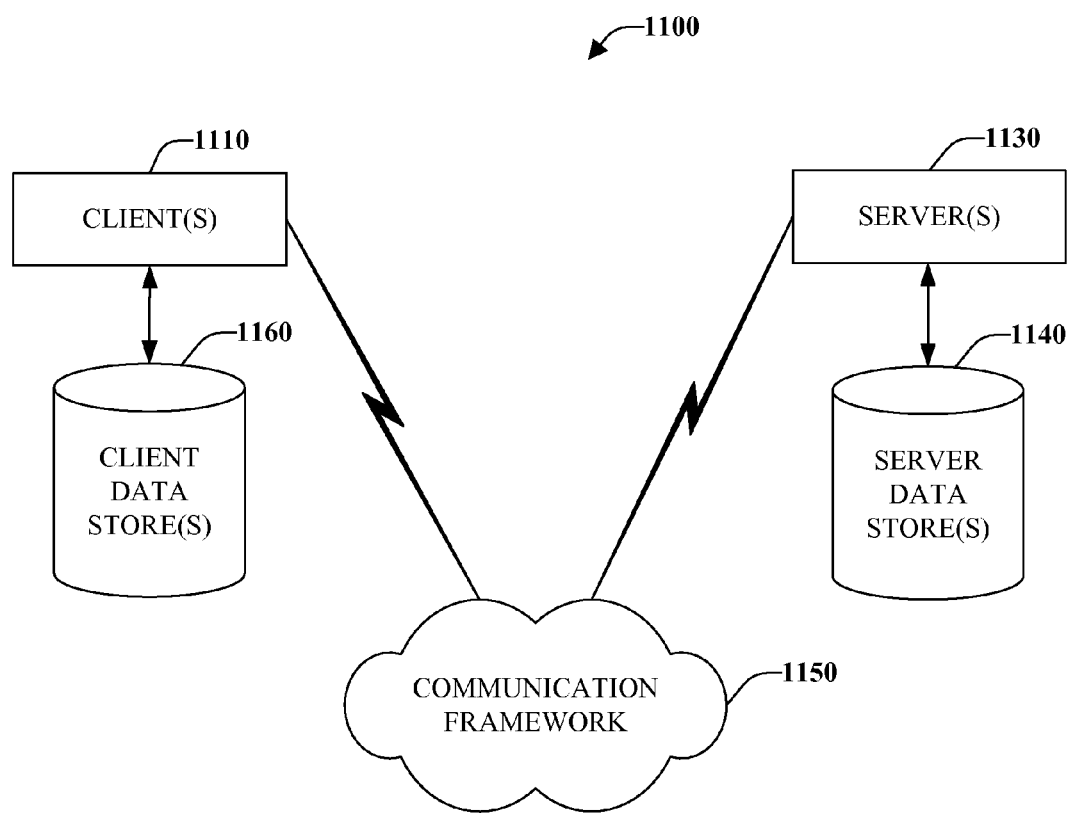
FIG. 11 is a schematic block diagram of a sample-computing environment.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor, multiprocessor or multi-core processor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 10, an exemplary environment 1010 for implementing various aspects disclosed herein includes a computer 1012 (e.g., desktop, laptop, server, hand held, programmable consumer or industrial electronics . . . ). The computer 1012 includes a processing unit 1014, a system memory 1016, and a system bus 1018. The system bus 1018 couples system components including, but not limited to, the system memory 1016 to the processing unit 1014. The processing unit 1014 can be any of various available microprocessors. It is to be appreciated that dual microprocessors, multi-core and other multiprocessor architectures can be employed as the processing unit 1014.

The system memory 1016 includes volatile and nonvolatile memory. The basic input/output system (BIOS), containing the basic routines to transfer information between elements within the computer 1012, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1012 also includes removable/non-removable, volatile/non-volatile computer storage media. FIG. 10 illustrates, for example, mass storage 1024. Mass storage 1024 includes, but is not limited to, devices like a magnetic or optical disk drive, floppy disk drive, flash memory or memory stick. In addition, mass storage 1024 can include storage media separately or in combination with other storage media.

FIG. 10 provides software application(s) 1028 that act as an intermediary between users and/or other computers and the basic computer resources described in suitable operating environment 1010. Such software application(s) 1028 include one or both of system and application software. System software can include an operating system, which can be stored on mass storage 1024, that acts to control and allocate resources of the computer system 1012. In particular, operating system can include diagnostic components capable of monitoring and averting failure of a hard disk drive. Application software takes advantage of the management of resources by system software through program modules and data stored on either or both of system memory 1016 and mass storage 1024.

The computer 1012 also includes one or more interface components 1026 that are communicatively coupled to the bus 1018 and facilitate interaction with the computer 1012. By way of example, the interface component 1026 can be a port (e.g., serial, parallel, PCMCIA, USB, FireWire . . . ) or an interface card (e.g., sound, video, network . . . ) or the like. The interface component 1026 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1012 to output device(s) via interface component 1026. Output devices can include displays (e.g., CRT, LCD, plasma . . . ), speakers, printers and other computers, among other things.

FIG. 11 is a schematic block diagram of a sample-computing environment 1100 with which the subject innovation can interact. The system 1100 includes one or more client(s) 1110. The client(s) 1110 can be hardware and/or software (e.g., threads, processes, computing devices). The system 1100 also includes one or more server(s) 1130. Thus, system 1100 can correspond to a two-tier client server model or a multi-tier model (e.g., client, middle tier server, data server), amongst other models. The server(s) 1130 can also be hardware and/or software (e.g., threads, processes, computing devices). The servers 1130 can house threads to perform transformations by employing the aspects of the subject innovation, for example. One possible communication between a client 1110 and a server 1130 may be in the form of a data packet transmitted between two or more computer processes.

The system 1100 includes a communication framework 1150 that can be employed to facilitate communications between the client(s) 1110 and the server(s) 1130. The client(s) 1110 are operatively connected to one or more client data store(s) 1160 that can be employed to store information local to the client(s) 1110. Similarly, the server(s) 1130 are operatively connected to one or more server data store(s) 1140 that can be employed to store information local to the servers 1130. Both the one or more client data store(s) 1160 and the one or more server data store(s) can utilize hard disk drives to maintain data. Both client(s) 1110 and server(s) 1130 can utilize a diagnostic component to prevent failure of data stores and mitigate loss of data.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A system that facilitates maintaining hard disk drive performance, comprising:
    an information component that obtains disk information about a condition of an operating environment of a hard disk drive;
    an evaluation component that analyzes the disk information and determines an appropriate action that reduces a risk of damage to the hard disk drive under the condition; and
    a response component that controls performance of the appropriate action that reduces the risk of damage to the hard disk drive.

2. The system of claim 1, further comprising:
    a disk policy store that maintains at least one disk policy, wherein the evaluation component is further configured to determine the appropriate action by retrieving a disk policy from the disk policy store and analyzing the disk information as a function of the disk policy.

3. The system of claim 2, wherein the at least one disk policy maintained by the disk policy store includes a disk policy that is defined based at least in part upon a user input.

4. The system of claim 1, further comprising:
    a disk history component that maintains a historical record of the disk information about the operating environment condition,
wherein the evaluation component determines the appropriate action as a function of the historical record of the disk information.

5. The system of claim 1, wherein
    the disk information obtained by the information component includes a suggested response to the operating environment condition,
    the evaluation component is determines the appropriate action as a function of the suggested response.

6. The system of claim 1, further comprising a user interface that presents an alert to a user based at least in part upon the disk information.

7. The system of claim 1, further comprising a machine learning component that employs at least one of a probabilistic or statistical-based analysis that infers the appropriate response action.

8. The system of claim 1, wherein the appropriate action is at least one of throttling hard disk drive input/output (I/O), switching the hard disk drive to sleep mode, performing disk checks, or combinations thereof.

9. The system of claim 8, the response component updates an event log that reflects the appropriate action.

10. A method for controlling a computer system having a plurality of components including a hard disk drive to avert hard disk drive failure, comprising:
    obtaining information associated with the hard disk drive;
    evaluating the information in accordance with a disk policy for averting damage to the hard disk drive; and
    controlling a component of the computer system to avert hard disk drive damage based at least in part upon the evaluation.

11. The method of claim 10, further comprising mitigating loss of data due to hard disk drive damage.

12. The method of claim 10, further comprising:
    determining when a hostile hard disk drive condition has abated; and
    returning to normal operation of the hard disk drive.

13. The method of claim 10, further comprising:
    recording disk information;
    and recording reactions triggered by the disk information.

14. The method of claim 10, further comprising analyzing a current context of a computing system associated with the hard disk drive, the reaction is based at least in part upon the current context.

15. The method of claim 10, further comprising evaluating a suggested reaction included within the disk information, the reaction is a function of the suggested reaction.

16. The method of claim 10, wherein controlling the component comprises controlling the hard disk drive to at least one of throttle hard disk drive input/output (I/O), switching the hard disk drive to sleep mode, performing disk checks, and shutting down the hard disk drive.

17. The method of claim 10, wherein the information associated with the hard disk drive includes at least one of a temperature of the hard disk drive, a vibration of the hard disk drive, an indication of a sudden physical shock of the hard disk drive.

18. A system that facilitates preventing failure of a hard disk drive, the system comprising:
    means for receiving a notification indicating a condition of the operating environment of the hard disk drive;
    means for evaluating the notification as a function of a set of policies to select an action that reduces a risk of hard disk drive failure; and
    means for performing the selected action to reduce the risk of hard disk drive failure.

19. The system of claim 18, further comprising means for mitigating loss of data due to damage of the hard disk drive as a function of the notification.

20. The system of claim 18, further comprising means for adapting at least one policy of the set of policies based upon a user preference.

* * * * *